UNITED STATES PATENT OFFICE.

WILLIAM F. NIEDRINGHAUS, OF ST. LOUIS, MISSOURI, ASSIGNOR TO THE ST. LOUIS STAMPING COMPANY, OF SAME PLACE.

MANUFACTURE OF ENAMELED WARE.

SPECIFICATION forming part of Letters Patent No. 607,625, dated July 19, 1898.

Application filed December 9, 1897. Serial No. 661,298. (No specimens.)

*To all whom it may concern:*

Be it known that I, WILLIAM F. NIEDRINGHAUS, a citizen of the United States, residing at the city of St. Louis, State of Missouri, have invented a certain new and useful Improvement in the Manufacture of Enameled Ware, of which the following is a full, clear, and exact description, such as will enable others skilled in the art to which it appertains to make and use the same.

This invention relates to a new and useful improvement in the manufacture of enameled ware; and it consists, essentially, in a method of treating the base or the part which is to be enameled preparatory to said base or part receiving the enamel.

Letters Patent of the United States No. 564,217, dated July 21, 1896, were granted to The St. Louis Stamping Company, of St. Louis, Missouri, for an improvement in the manufacture of enameled ware to obviate the presence of pin-holes, flecks, and chips from the finished enameled article in which sulfur was introduced into the annealing-pot for the purpose of preventing the production of bubbles, pin-holes, flecks, and scale-like chips. By so treating the base a coat of enamel firmly and uniformly adheres thereto and a superior article of enameled ware is produced.

This present invention is designed more particularly as an improvement upon the above patent, and relates to the same step in the process of manufacturing enameled ware as said patent. In the patent before mentioned chlorid of calcium is stated as being used in addition to the sulfur in the annealing-pot; but I have since found by experiment that chlorid of calcium, if used by itself, will have a good effect on the base to be enameled and will produce a good article of enameled ware without the use of sulfur.

Chlorid of calcium when used in the annealing-pot thoroughly cleanses the base and renders its pores sensitive, so that the enamel is readily received and firmly and uniformly adheres thereto.

In carrying my present invention into effect I preferably make a bath composed of about one part of chlorid of calcium and two parts of water and immerse the base therein before it is annealed. I then anneal the base in the presence of this chlorid of calcium, and after such annealing the usual steps are taken to pickle the article, coat the same with enamel, and bake the enamel on the base. Sulfur can also be used in connection with this chlorid of calcium by sprinkling the same over the base after the base has been immersed in the chlorid-of-calcium bath.

I am aware that other chlorids, such as chlorid of sodium, &c., can be used instead of the chlorid of calcium herein mentioned, as well as salt of ammonia and niter; but none of these give such good results as follow from the use of chlorid of calcium, and therefore I do not wish to be understood as limiting myself to the use of chlorid of calcium.

Having thus described my invention, what I claim, and desire to secure by Letters Patent, is—

1. The process herein described of preparing the base for receiving a coat of enamel, which consists in annealing said base in the presence of a chlorid, substantially as described.

2. The herein-described process of preparing the base for receiving a coat of enamel, which consists in immersing the same in a chlorid-bath, and then annealing said base, substantially as described.

3. The herein-described process of preparing a base for receiving a coat of enamel, which consists in immersing said base in a bath composed of two parts of water and one part of chlorid of calcium, sprinkling sulfur on the base after it has been so immersed, and then annealing the base, substantially as described.

In testimony whereof I hereunto affix my signature, in the presence of two witnesses, this 3d day of December, 1897.

WILLIAM F. NIEDRINGHAUS.

Witnesses:
F. R. CORNWALL,
HUGH K. WAGNER.